United States Patent [19]

Lange

[11] 4,391,501

[45] Jul. 5, 1983

[54] CAMERA WITH ATTACHABLE FLASH DEVICE

[75] Inventor: Karl-Heinz Lange, Bunde, Fed. Rep. of Germany

[73] Assignee: Balda-Werke Photographishe Gerate und Kunststoff GmbH & Co., KG, Bunde, Fed. Rep. of Germany

[21] Appl. No.: 299,455

[22] Filed: Sep. 4, 1981

[30] Foreign Application Priority Data

Sep. 5, 1980 [DE] Fed. Rep. of Germany ....... 3033463

[51] Int. Cl.³ .............................................. G03B 15/03
[52] U.S. Cl. ................................................ 354/149
[58] Field of Search .............. 354/126, 129, 133, 137, 354/138, 139, 145, 147, 149, 187, 230

[56] References Cited

U.S. PATENT DOCUMENTS

4,181,415  1/1980  Uchiyama et al. ............. 354/145 X
4,189,222  2/1980  Maitani ............................... 354/126

Primary Examiner—John Gonzales
Attorney, Agent, or Firm—Blum, Kaplan, Friedman, Silberman & Beran

[57] ABSTRACT

A camera adapted to receive an attachable flash device includes a transfer mechanism to place the flash in an off position when the camera is placed in a non-operational position is provided. The transfer mechanism operatively sets the shutter assembly in the camera in response to displacement of the on-off switch of the flash device to an operational position. The transfer mechanism is operatively coupled to the on-off switch of the flash device and is displaced when a camera element is displaced to put the camera in a non-operational condition. This prevents accidental discharge of the flash which results in inadvertent discharging of the flash batteries. The camera element to be displaced to put the camera in a non-operational condition may be a closing lens cover, a lens slide or a retracting lens assembly.

16 Claims, 4 Drawing Figures

CAMERA WITH ATTACHABLE FLASH DEVICE

BACKGROUND OF THE INVENTION

This invention relates to cameras adapted to receive a flash device, and in particular to cameras including a transfer mechanism for placing the flash in an OFF position in response to the camera being placed in a non-operational position.

In conventional cameras of this type, as illustrated in German Patent Specification DE-PS No. 22 51 756, attachment of the flash device and activation of the flash on-off switch results in adjustment of the lens and shutter assembly in the camera. One disadvantage of this type of device is that the user of the camera may lay the camera aside with the flash attached after the camera has been set in a non-working position. For example, this may include covering the lens by a cover slide or a lens cap. If this is done without placing the on-off switch of the flash device in the OFF position, the flash unit may discharge itself. The same situation tends to occur after the flash has been removed and the user has inadvertently left the device in the OFF position.

In another camera construction adapted to receive an attachable flash device, as shown in German Specification DE-AS No. 25 53 843 and British Pat. No. 1,494,166, measures have been taken to prevent inadvertent discharge of the flash after it has been removed from the camera. However, it may occur that the camera is laid aside when turned to an OFF position, such as with a folded visor, without the flash having been switched to the off position. In this case, inadvertent discharge of the flash can occur resulting in a discharge of the flash batteries.

Accordingly, it would be desirable to provide a camera including an attachable flash device which overcomes the shortcomings of the cameras of this type known in the prior art. Such a camera would prevent inadvertent discharge of the flash and the flash batteries when the flash device is attached to the camera, at all times that the camera is placed in a non-working condition.

SUMMARY OF THE INVENTION

A camera adapted to receive an attachable flash device including a transfer mechanism which places the flash in an OFF position each time the camera is placed in a non-operational condition is provided. The transfer mechanism is operatively coupled between the on-off switch of the flash device and the lens and shutter assembly of the camera. When the on-off switch of the flash device is placed in an ON position, the transfer mechanism operatively engages the lens and shutter assembly to place it in an appropriate flash setting. When the camera is placed in an non-operational position, the on-off switch of the flash device is placed in an OFF position by the transfer mechanism. This operational coupling of the operational condition of the camera and the on-off switch of the flash device prevents inadvertent discharge of the flash device and results in maintaining the charge of the flash batteries.

Displacement of various types of camera elements utilized to place the camera in a non-operational condition may be utilized to place the flash in an OFF position. Such camera elements include, a slideable covering plate for the optical system, a closing lens cap, or a lens assembly which is retracted into the camera body may be utilized to initiate placing the flash device into an OFF position. The construction is particularly convenient as these elements are generally activated when placing the camera in a non-operational position. As the same movement places the flash device into an OFF position, inadvertent discharge of the flash and resultant discharge of the flash batteries can be avoided.

Accordingly, it is an object of the invention to provide an improved camera.

It is another object of the invention to provide an improved construction for a camera adapted to receive an attachable flash device.

It is a further object of the invention to provide a camera with an attachable flash device wherein the flash device is placed in an OFF position in response to placing the camera in a non-operational position.

Still another object of the invention is to provide a camera with an attachable flash device wherein inadvertent discharge of the flash is avoided.

Still a further object of the invention is to provide a camera adapted to receive an attachable flash device including a transfer mechanism operatively coupled to the on-off switch of the flash device for placing the flash device in an OFF position in response to placing the camera in a non-operational position.

Yet another object of the invention is to provide an improved camera and attachable flash device combination.

Still other objects and advantages of the invention will in part be obvious and will in part be apparent from the specification.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENTS

Figure 1:
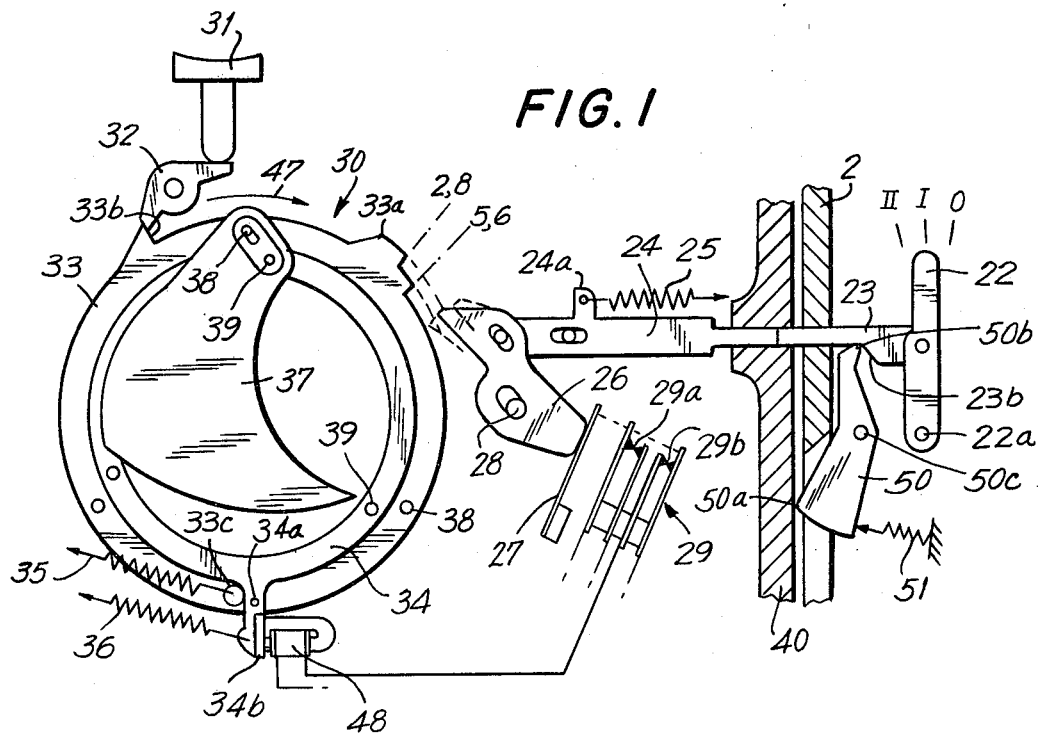
FIG. 1 is a front elevational view, in schematic, illustrating a shutter locking mechanism and a flash transfer mechanism constructed and arranged in accordance with the invention.

An electronically controlled programmed shutter 30 in accordance with the invention includes an opening ring 33 including three pins 38 equidistantly spaced over the surface thereof. Pins 38 ride in elongated openings 37a of three corresponding shutter blades 37, only one of which is illustrated in FIG. 1. Shutter blades 37 are osciallatably mounted on three pivot pins 39 equidistantly distributed over the surface of a locking ring 34.

A tension spring 35 is mounted to shutter opening ring 33 and biases ring 33 in a clockwise direction. Opening ring 33 is formed with a nose region 33b which is biased against a release pawl 32 pivotably mounted by a pin 32a. A shutter release button 31 is mounted through the camera body (not shown in detail, but a wall 40 is shown) and releases release pawl 32 from engagement with nose 32b and, under the tension from spring 35 opening ring 33 rotates in the clockwise direction of an arrow 47.

FIG. 1 further shows locking ring 34 bearing pins 39, on which shutter blades 37 are oscillatably mounted. Locking ring 34 includes an anchor arm 34a on which is mounted a tension spring 36 for biasing locking ring 34 also in the clockwise direction of arrow 47. Anchor arm 34a also includes a magnetic anchor disk or plate 34b which is in contact with an electric holding magnet 48. Locking ring 34 is secured in the cocked position shown in FIG. 1 and can only oscillate in the clockwise direction of arrow 47 after a tensioning pin 33c on opening ring 33 has freed the rotational path of locking ring 34 at anchor arm 34a and holding magnet 48 has been neutralized so that anchor plate 34b is released from magnetic traction therefrom.

Opening ring 33 is formed with a tongue or lug 33a having at least two steps which lie on different radii. An outer step 33d is designated as "2.8" is recessed in relationship to an inner step 33e which is designated as "5.6". The designations "2.8" and "5.6" indicate that these two steps are related to the corresponding "f-stop" values given to the lens opening.

A flash device having an outer shell 2 is shown mounted adjacent to wall 40 of the camera compartment. The flash device includes an oscillatable lever 22 pivotably mounted at a pin 22a and including three positions, marked "O", "I" and "II". In position "O" the flash device is turned off. In position "I" the flash device is designed to discharge at a lens opening of f.2.8 and in position "II" the flash device is set to discharge at a lens opening of f.5.6. Lever 22 is pivotably mounted within the flash device 2 by a pin 22a and operatively coupled to a tappet 23 by a pin 23a. Thus, lever 22 pivots between its various positions in response to horizontal displacement of tappet 23. When flash device 2 is mounted on the camera body tappet 23 abuts an elongated flash slide 24 within camera compartment 40. Flash slide 24 includes an arm 24a on which is mounted a restoring spring 25 which biases slide 24 to outer wall 40 and tappet 23 through an opening 40a in camera wall 40.

The interior end (towards the left in FIG. 1) of flash slide 24 is linked to a transfer member 26 by a pin 24b mounted in a first slot 26a in transfer member 26. Displacement of transfer member 26 is guided by means of a stationary support pin 28 mounted through a second slot 26b. Transfer member 26 is maintained in the shutter-cocked position shown in FIG. 1 by a leaf spring 27 mounted within camera compartment 40. Positioned between leaf spring 27 and wall 40 is a set of contacts of a switch assembly indicated generally as 29. Only a portion of contacts 29 is shown which is sufficient for description of the mechanical contact in accordance with the invention. Contacts 29 includes a synchronized contact 29a for closing a current circuit (not shown) to the flash device for discharge of the flash device and an interrupting contact 29b for initiation of the shutter closing upon discharge of the flash device.

Having described the elements of the shutter assembly and auxiliary flash device of FIG. 1, closing of the shutter upon discharge of the flash and placing the flash in an off condition will now be described. In the following description, the flash device has been mounted to camera wall 40 and set from the OFF position "O" to the "I" position for discharge at a lens opening of f2.8. Shutter 30 is released by depressing shutter release button 31 which pivots release pawl 32 out of engagement with nose 33b on opening ring 33 which rotates in a counter-clockwise direction of arrow 47. As opening ring 33 rotates, lug 33a at step 33d designated as "2.8" reaches free end 26c of transfer member 26. Upon further rotation of opening ring 33, transfer member 26 is displaced towards switch assembly 29 and contact end 26d overcomes the force of leaf spring 27 and closes flash contact 29a which closes the current circuit to the flash device for flash discharge at the instant of the largest lens opening. As transfer member 26 continues its displacement, interrupting contact 29b is opened thereby interrupting the current supplied to electromagnet 48. As electromagnet 48 is deenergized it is demagnetized and plate 24b of anchor arm 34a on locking ring 34 is released from magnetic engagement with electromagnet 48. Locking ring 34 rotates in counter-clockwise direction of arrow 47 as tensioning pin 33c has been displaced from engagement with anchoring arm 34a. Shutter 30 then closes independently of the timing device of the camera.

When the flash device has been set at position II corresponding to a lens opening of "5.6", the two respective switching steps occur in similar fashion. When lever 22 is displaced to the left at position II to correspond to the f5.6 lens aperture setting, tappet 23 is displaced towards the left so that flash slide 24 places free end 26c of transfer member 26 within the locus of step 33e of opening ring 33 at the "5.6" designation. Transfer member 26 is displaced towards switch member 29 in the same manner as when flash device is set at position I for a lens opening of 2.8. At this time, interrupting contact 29b is activated when the lens aperture reaches the maximum f5.6 lens opening. Again, flash discharge occurs at the instant of maximum lens opening, in this case, a lens opening corresponding to 5.6.

Flash slide 24 is biased towards camera wall 40 by resetting spring 25. As flash device 2 is removed from attachment to the camera body flash slide 24 is displaced towards camera wall 40 as tappet 23 no longer engages it for displacement toward the lens axis. This removes transfer member 26 from operational position between lug 33a and switch assembly 29.

Also shown in FIG. 1 is a flash resetting pawl 50 pivotally mounted by a pin 50c. Resetting pawl 50 includes a nose 50a abutting camera compartment wall 40 through an opening 2a in wall 2 of the flash device. Resetting pawl 50 also includes a finger 50b abutting against a lug 23b of tappet 23. Resetting pawl 50 is biased in a clockwise direction about pin 50c by a spring 51. Upon removal of the flash device from the camera, resetting pawl 50 is displaced clockwise so that finger 50b urges lug 23b towards the interior of the flash device and pivots lever 22 to the left or position "O" or the OFF condition. When the flash device is attached to the camera body, nose 50a abuts the outer side of camera wall 40 which pivots resetting pawl 50 in a counterclockwise direction so that finger 50b is removed from engagement with lug 23b. Lever 22 is then free to be selectively displaced to the different positions indicated as "O", "I" and "II", corresponding to OFF, a lens opening of f2.8 or a lens opening of f5.6, respectively. Resetting pawl 50 insures that upon removal of the flash device from the camera body it will be placed in an OFF position.

The remaining figures of the application show alternative embodiments of the invention wherein various camera elements provide a similar action on flash slide 24 and tappet 23 for placing the flash device in an OFF position when the camera is placed in a non-operational condition. In view of the similarity of the action of the elements, similar elements which perform in a similar manner to those illustrated in FIG. 1, have been identified by the same reference numerals "primed".

Figure 2:
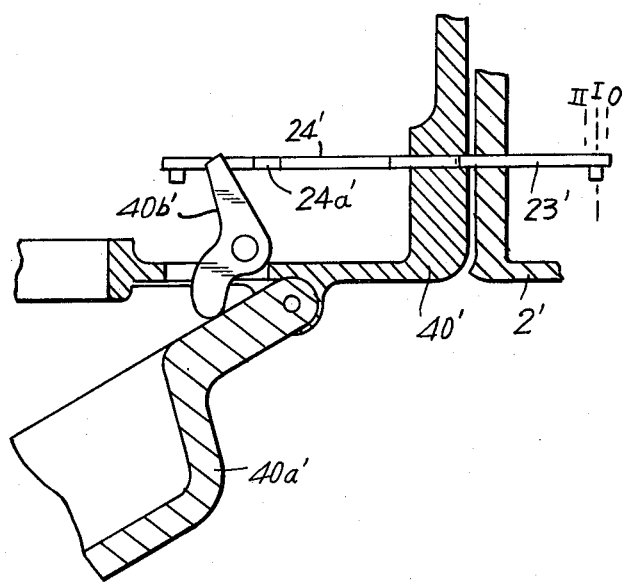
FIG. 2 is a partial sectional plan view illustrating a camera lens closed flap for placing the flash in an OFF position in response to placing the camera in a non-operational condition.

Turning now to FIG. 2, flash slide 24′ and nose 24a′ are shown in plan view. The camera includes a closing flap 40a′ for covering the lens when turned in a clockwise direction. A closing pawl 40b′ is pivotally mounted so that pawl 40b′ pivots towards the direction of nose 24a′ when closing flap 40a′ is placed over the camera lens. As closing pawl 40b′ abutts nose 24a, flash slide 24′ is displaced to the right in FIG. 2. This movement displaces tappet 23′ and places flash lever 22 in an OFF position designated as "O". When closing flap 40a′ is opened in the counter-clockwise direction, jack 40b′ is freed from engagement with nose 24a′ and tappet 23′ can be displaced freely towards the left to be placed either position "I" or "II" corresponding to a lens opening of f2.8 or f5.6.

Figure 3:
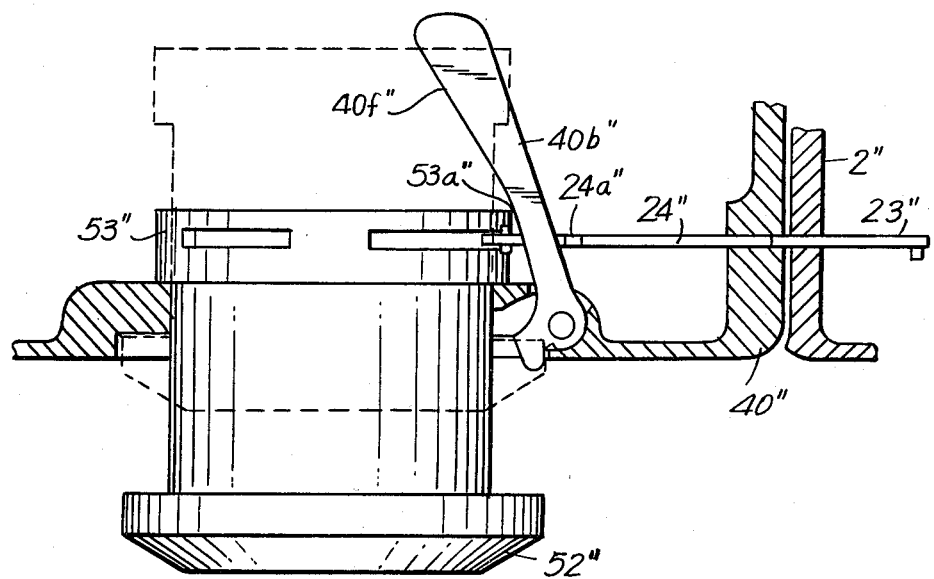
FIG. 3 is a partial sectional plan view of a retractable lens assembly which places the flash device in an OFF position in response to placing the camera in a non-operational condition.

Turning to FIG. 3, an embodiment wherein displacement of a lever 40b″ is controlled by movement of a lens cylinder 52′. Lever 40b″ is pivoted into engagement with nose 24a″ on flash slide 24″ in response to displacement of lever 40b″ which is pivotted in a clockwise direction for placing flash device in an OFF position when lens cylinder 52′ is retracted into camera body 40″. The lens assembly includes a locking ring 53″ which is engaged by flash slide 24a′ when the flash device is placed in an open position for controlling shutter release. The back end of locking ring 53″ includes a back border 53a′ for engaging in inclined surface 40f″ on lever 40b″ for pivoting lever 40b″ when the lens assembly is retracted into camera body 40.

Figure 4:
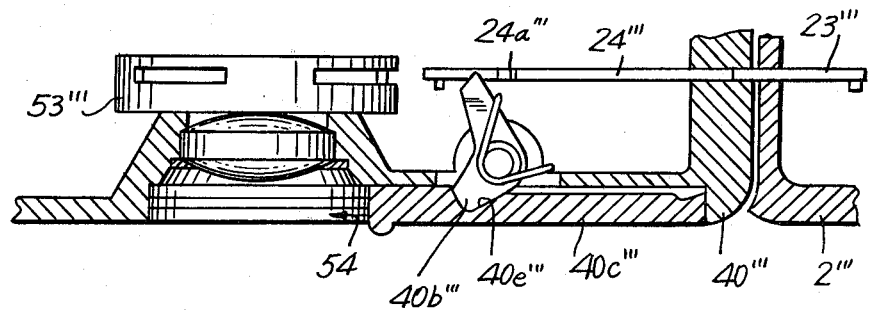
FIG. 4 is a partial sectional plan view illustrating a lens cover slide for placing the flash in an OFF position in response to placing the camera in a non-operational condition.

In the embodiment illustrated in FIG. 4, pawl 40b‴ is pivotally mounted and extends into a groove 40e‴ formed in a locking slide 40c′ for covering the lens assembly. The second arm 40d‴ of pawl 40b‴ engages flash slide 24‴ when pivotted in a clockwise direction as lens slide 40c‴ is displaced in the front of the lens assembly illustrated by an arrow 54. Displacement of flash slide 24‴ towards the right places the flash device in an OFF condition in the manner described with respect to the earlier embodiments.

Accordingly, by providing a construction for a camera and flash device in combination in accordance with the invention, the flash device will always be placed in a non-operational condition in response to displacement of a camera element for placing the camera in a non-operational condition. For example, the camera element which places the camera in a non-operational position may be a pivoting closing flap as shown in FIG. 2, a retracting lens assembly as shown in FIG. 3, or a lens slide as illustrated in FIG. 4. In each case, placing the camera in a non-operational position by displacement of a particular camera element displaces the flash slide for turning the flash switch to the OFF position. Thus, accidental discharge of the flash is prevented when the camera is not in use thereby preserving the charge on the flash batteries.

It will thus be seen that the objects set forth above, among those made apparent from the preceding description, are efficiently attained and, since certain changes may be made in the above construction without departing from the spirit and scope of the invention, it is intended that all matter contained in the above description of shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A camera and attachable flash device in combination, comprising:
   a camera body including a lens and shutter assembly;
   camera on-off means for placing the camera in an operational or non-operational condition;
   a flash device adapted to be mounted on the camera body and coupled to the lens and shutter assembly, the flash device including an on-off switch for placing the flash device in an operational or non-operational condition; and
   transfer means coupling said lens and shutter assembly to the on-off switch of the flash device for operatively setting the lens and shutter assembly at an appropriate flash setting and for placing the flash device into the off position in response to the camera on-off means being placed in a non-operational position.

2. The camera and flash device combination of claim 1, wherein the flash device includes return means coupled to the on-off switch for placing the switch in an off position when the flash is removed from the camera body.

3. The camera and flash combination of claim 1, wherein the camera on-off means is a pivotally mounted lens cap for covering the lens for placing the camera in a non-operational condition.

4. The camera and flash device combination of claim 1, wherein the camera on-off means is a lens cover slide which slides across the lens for placing the camera into a non-operational condition.

5. The camera and flash device combination of claim 1, wherein the camera on-off means is a lens and shutter assembly retractable into the camera body for placing the camera into a non-operational condition.

6. The camera and flash device combination of claim 1, wherein the transfer means is a flash slide oscillateably mounted for displacement in the camera body and coupled to the lens and shutter assembly and the camera on-off means, the camera on-off means including a pivotally mounted lever operatively coupled to the flash slide for displacing the flash slide in response to placement of the camera on-off means into a non-operational position, displacement of the flash slide placing the flash device in an off position.

7. The camera and flash device combination of claim 1, wherein the camera body is formed with an opening adjacent to the flash device and the transfer means is a flash slide oscillateably mounted between the lens and shutter assembly and the opening, the flash device formed with an opening for cooperating with the opening in the camera body and a tappet coupled to the flash on-off switch for engaging the flash slide for displacing the flash slide towards the lens and shutter assembly when the flash on-off switch is displaced to an operational position towards the camera body.

8. A camera and flash device in combination, comprising:
a camera body including a lens and shutter assembly;
camera on-off means for placing the camera in an operational or non-operational condition;
a flash device adapted to be mounted on the camera body and coupled to the lens and shutter assembly, the flash device including an on-off switch for placing the flash device in an operational or non-operational condition;
transfer means coupling said lens and shutter assembly to the on-off switch of the flash device for operatively setting the lens and shutter assembly at an appropriate flash setting and for placing the flash device into the off position in response to the camera on-off means being placed in the non-operational position;
wherein the flash device includes return means coupled to the on-off switch for placing the switch in an off position when the flash is removed from the camera body; and
wherein the flash device includes a wall having an opening adjacent to the camera body, and the return means is a pivotable lever coupled to the flash on-off switch projecting through the opening and biased to the off position of the flash switch, the pivotable lever abutting the camera body when the flash device is mounted on the camera body for pivoting the lever away from the flash off position.

9. The camera and flash combination of claim 8, wherein the camera on-off means is a pivotally mounted lens cap for covering the lens for placing the camera in a non-operational condition.

10. The camera and flash device combination of claim 8, wherein the camera on-off means is a lens cover slide which slides across the lens for placing the camera into a non-operational condition.

11. The camera and flash device combination of claim 8, wherein the camera on-off means is a lens and shutter assembly retractable into the camera body for placing the camera into a non-operational condition.

12. The camera and flash device combination of claim 8, wherein the transfer means is a flash slide oscillateably mounted for displacement in the camera body and coupled to the lens and shutter assembly and the camera on-off means, the camera on-off means including a pivotally mounted lever operatively coupled to the flash slide for displacing the flash slide in response to displacement of the camera on-off means into a non-operational position, displacement of the flash slide placing the flash device in an off position.

13. The camera and flash device combination of claim 8, wherein the camera body is formed with an opening adjacent to the flash device and the transfer means is a flash slide oscillateably mounted between the lens and shutter assembly and the opening, the flash device formed with an opening for cooperating with the opening in the camera body and a tappet coupled to the flash on-off switch for engaging the flash slide for displacing the flash slide towards the lens and shutter assembly when the flash on-off switch is displaced to an operational position towards the camera body.

14. A camera adapted to receive a flash device comprising:
a camera body including a lens and shutter assembly;
camera on-off means for placing the camera in an operational or non-operational position;
transfer means selectively operatively coupled to said lens and shutter assembly and adapted to be coupled to a flash device which is to be mounted on the camera body for operatively setting the lens and shutter assembly at an appropriate flash setting, the transfer means activated in response to placing the camera on-off into an off position and the transfer means placing the flash device in a non-operational condition in response to placing the camera in an off position.

15. A camera and attachable flash device in combination, comprising:
a camera body including a lens and shutter assembly;
camera on-off means for placing the camera in an operational or non-operational condition;
a flash device adapted to be mounted on the camera body and coupled to the lens and shutter assembly, the flash device including an on-off switch for placing the flash device in an operational or non-operational condition;
transfer means coupling said lens and shutter assembly to the on-off switch of the flash device for placing the flash device into the off position in response to the camera on-off means being placed in a non-operational position; and
wherein the transfer means is flash slide oscillateably mounted for displacement in the camera body and coupled to the lens and shutter assembly and the camera on-off means, the camera on-off means including a pivotally mounted lever operatively coupled to the flash slide for displacing the flash slide in response to placement of the camera on-off means into a non-operational position, displacement of the flash slide placing the flash device in an off position.

16. A camera and attachable flash device in combination, comprising:
a camera body including a lens and shutter assembly;
camera on-off means for placing the camera in an operational or non-operational condition;
a flash device adapted to be mounted on the camera body and coupled to the lens and shutter assembly, the flash device including an on-off switch for placing the flash device in an operational or non-operational condition;
transfer means coupling said lens and shutter assembly to the on-off switch of the flash device for placing the flash device into the off position in response to the camera on-off means being placed in a non-operational position;
wherein the camera body is formed with an opening adjacent to the flash device and the transfer means is a flash slide oscillateably mounted between the lens and shutter assembly and the opening, the flash device formed with an opening for cooperating with the opening in the camera body and a tappet coupled to the flash on-off switch for engaging the flash slide for displacing the flash slide towards the lens and shutter assembly when the flash on-off switch is displaced to an operational position towards the camera body.

* * * * *